United States Patent
Sandel (10) Patent No.: US 8,812,189 B2
(45) Date of Patent: Aug. 19, 2014

(54) MOTORCYCLE ENGINE COOLING DEVICE AND SYSTEM

(76) Inventor: David Sandel, E. Moriches, NY (US)

( * ) Notice: Subject to any disclaimer, the term of this patent is extended or adjusted under 35 U.S.C. 154(b) by 755 days.

(21) Appl. No.: 13/095,964

(22) Filed: Apr. 28, 2011

(65) Prior Publication Data

US 2012/0277951 A1 Nov. 1, 2012

(51) Int. Cl.
| | |
|---|---|
| *G06F 7/00* | (2006.01) |
| *B62K 11/04* | (2006.01) |
| *B60K 11/06* | (2006.01) |
| *B60R 16/03* | (2006.01) |
| *B60K 35/00* | (2006.01) |
| *G01C 21/26* | (2006.01) |
| *B60R 16/023* | (2006.01) |
| *B60K 37/06* | (2006.01) |
| *F01P 5/02* | (2006.01) |
| *F02B 75/22* | (2006.01) |

(52) U.S. Cl.
CPC ............ *B62K 11/04* (2013.01); *B60R 16/0315* (2013.01); *B60K 35/00* (2013.01); *G01C 21/26* (2013.01); *B60R 16/0231* (2013.01); *B60K 37/06* (2013.01); *F01P 2005/025* (2013.01); *F01P 2050/16* (2013.01); *F02B 75/22* (2013.01); *B60K 11/06* (2013.01); *B60W 2300/36* (2013.01); *B60Y 2200/12* (2013.01)
USPC ............................ 701/36; 180/68.1; 180/68.2

(58) Field of Classification Search
CPC ........ B60K 11/08; B60K 11/04; B60K 11/06; B60K 11/02; F01P 11/10
USPC ...................... 310/51; 60/645, 226.1; 290/55; 123/195 R, 2, 41.7, 190.1, 41.31, 41.65; 701/36; 180/229, 68.1, 68.2, 215; 280/848, 304.3; 165/41, 51; 219/133; 440/77

See application file for complete search history.

(56) References Cited

U.S. PATENT DOCUMENTS

| | | | |
|---|---|---|---|
| 6,601,667 B2 | 8/2003 | Buell | |
| 6,904,885 B2 * | 6/2005 | Osband | 123/195 R |
| 7,303,034 B1 * | 12/2007 | Knuth | 180/68.1 |
| 7,557,458 B2 * | 7/2009 | Yamamoto et al. | 290/55 |
| 8,517,426 B2 * | 8/2013 | McMillan | 280/848 |
| 2003/0010558 A1 * | 1/2003 | Buell et al. | 180/229 |
| 2008/0115996 A1 | 5/2008 | Wright | |
| 2008/0238221 A1 * | 10/2008 | Yamamoto et al. | 310/51 |
| 2010/0300791 A1 * | 12/2010 | Kern | 180/229 |
| 2011/0203862 A1 * | 8/2011 | McMillan | 180/68.1 |
| 2012/0277951 A1 * | 11/2012 | Sandel | 701/36 |

* cited by examiner

*Primary Examiner* — Behrang Badii
(74) *Attorney, Agent, or Firm* — Jason T. Daniel, Esq.; Daniel Law Offices, P.A.

(57) ABSTRACT

An engine cooling device for providing fresh air to an engine includes a first and second fan assembly for producing concentrated airflow, a mounting bracket configured to position the first and second fan assemblies adjacent to the engine jugs, and a wiring harness for providing instructions and power to each of the first and second fan assemblies. A system for monitoring and adjusting the individual temperatures of each jug includes an engine cooling device and a control system that includes a processor, memory, Input/Output devices and a communication medium for communicating commands to the engine cooling device.

17 Claims, 10 Drawing Sheets

MOTORCYCLE ENGINE COOLING DEVICE AND SYSTEM

BACKGROUND

Field of the Invention

The present invention relates generally to cooling systems for motorcycles, and more particularly to an air cooling system for a motorcycle engine.

Air cooled motorcycle engines rely on a flow of air over heat transfer surfaces such as fins to cool the engine. To this end, when a motorcycle is operated in hot climates or at low speeds, the available air flow to the engine is often insufficient to maintain a temperature that is comfortable to the rider due to the proximity of the riders legs to the engine. Moreover, owing to the design of conventional v-twin engines, it is common for the rear cylinder to become much hotter than the front cylinder due to the partially concealed location of the rear cylinder.

Over time, this temperature difference can cause the engine as a whole to run poorly and result in increased maintenance costs over the life of the motorcycle. Additionally, if the temperature of either cylinder gets too high, a catastrophic failure may occur which has the potential to damage the motorcycle and injure the rider if the failure occurs while the motorcycle is in operation.

There have been previous cooling systems in the prior art utilizing fans and other such devices. Known prior art includes U.S. Pat. No. 6,601,667, U.S. Pat. No. 7,303,034 and U.S. Pat. Publication No: 2008-0115996. However, none of these devices feature a permanently mounted direct air delivery system that can be customized for each jug (i.e. cylinder) without covering a large portion of the engine itself, or requiring that existing components (such as the horn, for example) be relocated.

In light of the above, it would be beneficial to provide a motorcycle engine cooling device and system that is easy to install, easy to operate and does not suffer from the drawbacks described above.

SUMMARY OF THE INVENTION

The present invention is directed to an engine cooling device for providing fresh air to an engine. One embodiment of the present invention can include a first and second fan assembly for producing concentrated airflow, a mounting bracket configured to position the first and second fan assemblies adjacent to the engine jugs, a temperature sensor for determining the actual temperature of each engine jug, and a wiring harness for providing instructions and power to each of the first and second fan assemblies.

Another embodiment of the present invention can include a single fan assembly for providing airflow to a single jug.

Yet another embodiment of the present invention can include a system for monitoring and adjusting the individual temperatures of each jug.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although described below with respect to motorcycle engines, one of skill in the art will recognize that the inventive concepts can equally be utilized on virtually any type of air cooled engine ranging from motorcycles to scooters and ATV's among many others, for example. Accordingly, the description herein is not to be construed as limiting in scope.

Figure 1:
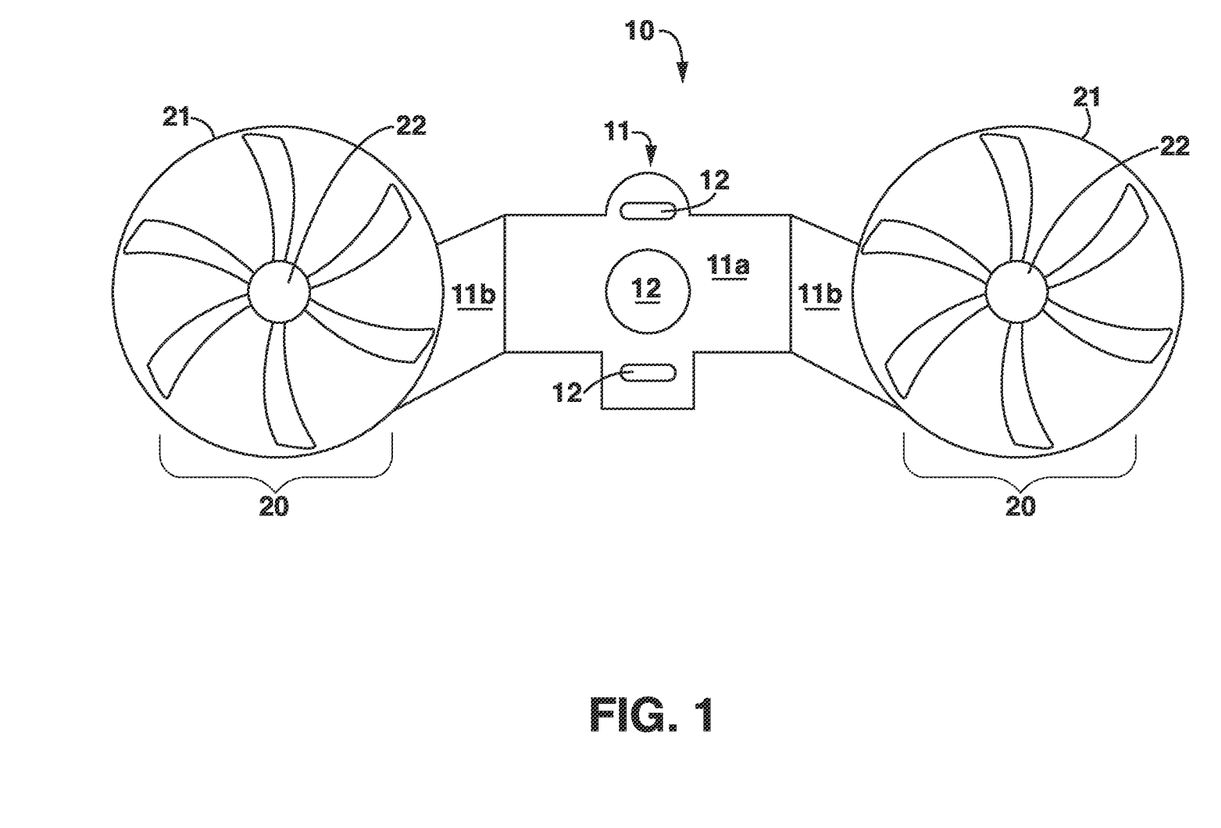
FIG. 1 is a frontal elevation of an engine cooling device that is useful for understanding the inventive concepts disclosed herein.
Figure 2:
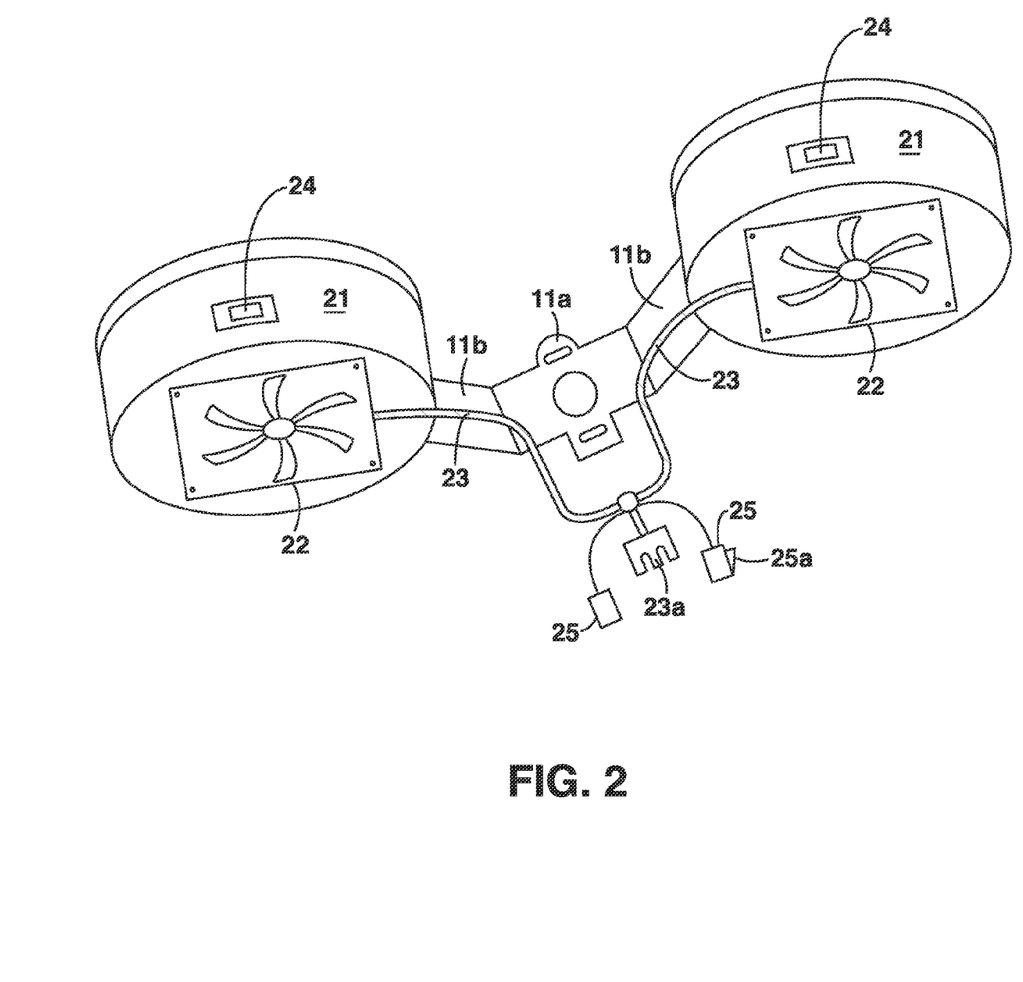
FIG. 2 is a perspective view of the engine cooling device according to one embodiment of the invention.

FIGS. 1 and 2 illustrate one embodiment of an engine cooling device 10 that is useful for understanding the inventive concepts disclosed herein. As shown, device 10 can include a fixed mounting bracket 11, and one or more cooling fan assemblies 20.

The fixed mounting bracket 11 can act to secure the device to the motorcycle. As such, the fixed mounting bracket 11 can include a generally planar central section 11a having a plurality of alignment openings 12 for connecting to the motorcycle. As shown, both the left and right side of the bracket 11 can also include a roughly 45 degree bend 11b which allows the bracket to extend outward before connecting to the cooling fan assemblies 20 via a weld or mounting hardware such as a nut and bolt, for example.

Owing to the fact that the device 10 is constructed to increase airflow to a motorcycle engine, it is preferred that the fixed mounting bracket 11 be as small as possible so as to not obstruct the natural flow of air to the engine. To this end, in one preferred embodiment, the fixed mounting bracket 11 can be constructed from a thin piece of hardened steel having a length, bend angle and openings positioned so as to be mounted to the existing hardware of a particular motorcycle or motorcycle engine. To this end, the bends and/or openings of the mounting bracket can be adjusted at a time of construction in order to allow the device to be mounted to a wide variety of motorcycles thus allowing the inventive concepts disclosed herein to be utilized on virtually any make and model of a motorcycle engine.

The cooling fan assembly 20 can act to cool a motorcycle engine by introducing fresh cool air to each jug (i.e., cylinder). To this end, the fan assembly can include a generally circular housing 21 having a waterproof fan 22 positioned therein. The fan assembly 20 can also include communication and power wiring 23, an auxiliary adapter 23a and one or more thermostat (heat) sensors 25.

In one embodiment, the auxiliary adapter 23a can include a conventional auxiliary plug configured to mate with the opposing conventional auxiliary plug provided in most Harley Davidson® motorcycles. To this end the device 10 can be remotely controlled by a user via the auxiliary switch commonly located on the handlebar of the motorcycle. Alternatively, in instances where the motorcycle does not include an auxiliary adapter and/or switch, the wiring 23 can be conventionally connected to the motorcycle battery (not shown), and each fan can be operated directly by the switch 24 positioned on the fan housing 21.

As described herein, the thermostat sensor 25 can include any number of conventional sensors for measuring temperature. In one example, thermostat sensor can act to measure the oil temperature of the engine, or can be secured directly to one or more engine fins via a clip 25a in order to measure the actual (as opposed to ambient) temperature of each engine jug. Oil temperature sensors and direct heat sensors are extremely well known in the art and a further description is not provided.

As described herein, the fan 22 can include any suitable direct current (DC) powered fan such as an axial fan or a radial fan, for instance. Moreover, it is preferred that the fan housing be constructed from lightweight steel or aluminum having excellent tensile strength and anti-corrosive properties.

Figure 3:
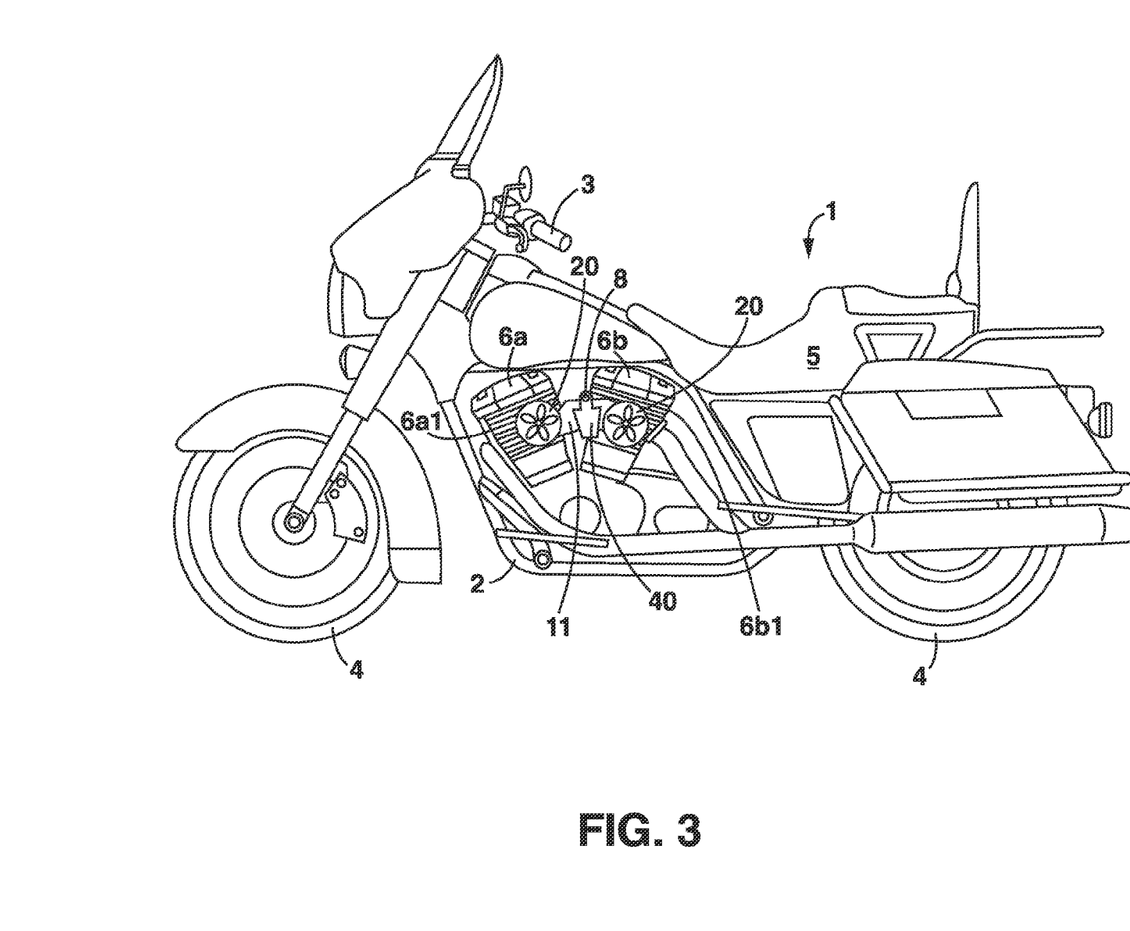
FIG. 3 is a side view of the engine cooling device on a motorcycle according to one embodiment of the invention.
Figure 3A:
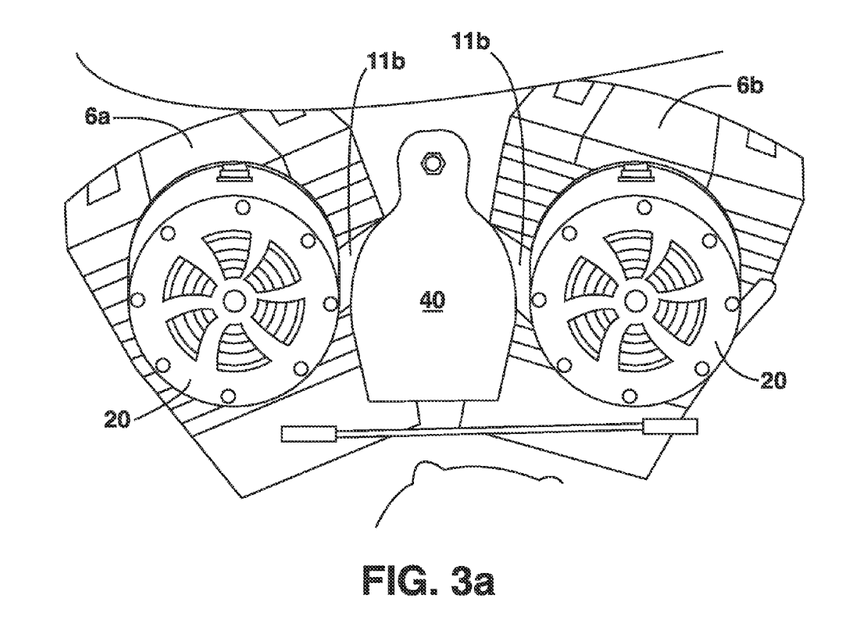
FIG. 3a is an up close side view of the engine cooling device on a motorcycle according to one embodiment of the invention.
Figure 4:
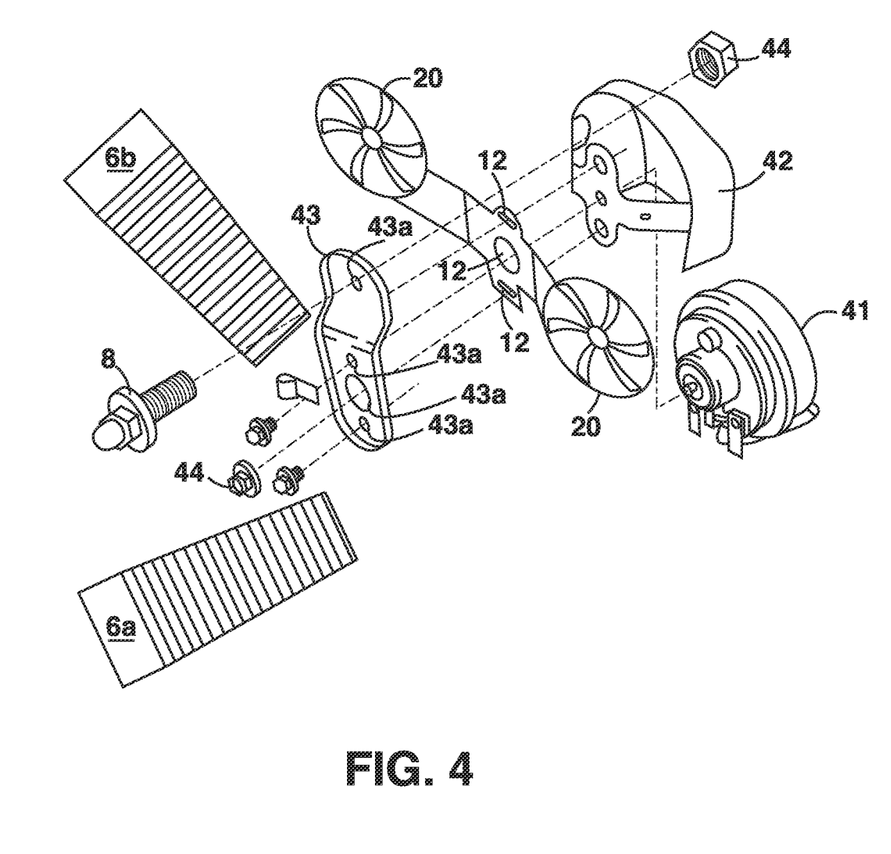
FIG. 4 is an exploded parts view of the engine cooling device on a motorcycle according to one embodiment of the invention.

FIGS. 3, 3a and 4 illustrate one embodiment of the engine cooling device 10 in conjunction with a conventional motorcycle 1. As shown, motorcycle 1 generally includes a frame 2, a steering assembly 3, wheels 4, a seat 5 an engine 6 and a horn assembly 40.

In this embodiment, the motorcycle 1 is depicted as a Harley Davidson® motorcycle having a v-twin style engine having a front jug (cylinder) 6a and a rear jug 6b. Each jug includes a plurality of thin metallic horizontal fins 6a1 and 6b1, respectively for allowing air to flow to the internal workings of the engine. As shown, the horn assembly 40 is mounted between each jug of the engine on a stud 8 with a vibration damper 7.

FIG. 4 is an exploded parts view showing one example of how the cooling device 10 can be connected to the frame of the horn assembly 40 without requiring the horn itself to be relocated. As shown, a horn assembly 40 typically includes a sound producing device 41 having a protective outer shell 42 and a horn mounting bracket (i.e. brace) 43. The brace 43 includes several holes 43a for connecting to both the protective shell 42 and the engine stud 8 via conventional hardware 44 (such as nuts and bolts, for example). In one preferred embodiment, the mounting bracket 11 can be interposed between the shell 42 and the brace 43 so that the bracket openings 12 and the brace holes 43a are aligned. When this occurs, the conventional horn mounting hardware 44 can be utilized to secure the device 10 to the motorcycle. Moreover, as described above, the mounting bracket 11 can preferably include a shape having a minimum surface area necessary for positioning each fan assembly 20 onto each engine jug 6a and 6b, without unnecessarily blocking the natural flow of air to the engine.

Although described above as including a mounting bracket 11 for a particular make of motorcycle, one of skill in the art will recognize that the frame 11 can be shaped to connect to any number of different motorcycles and engines without deviating from the scope and spirit of the inventive concepts disclosed herein.

Figures 5, 5A:
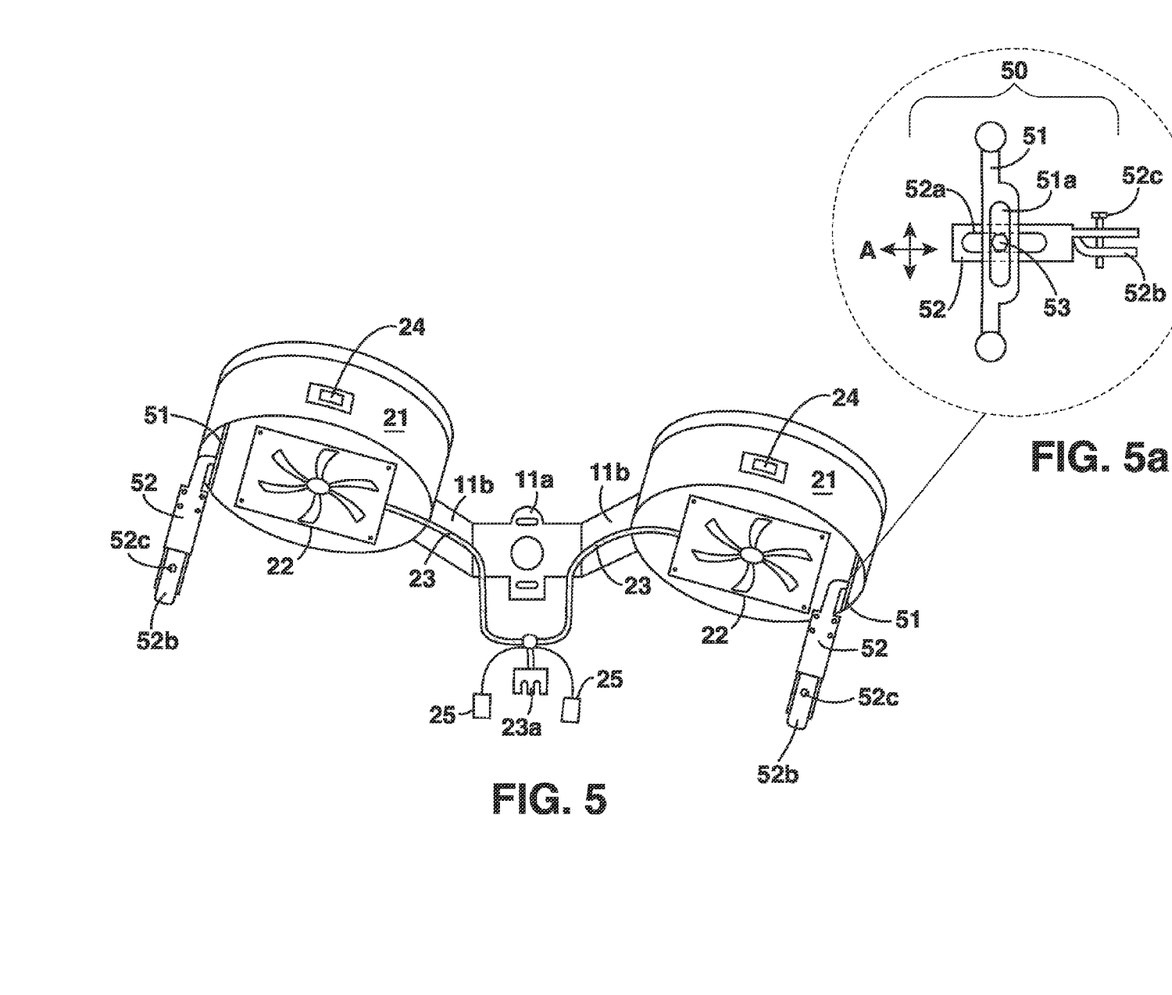
FIG. 5 is a perspective view of the engine cooling device according to another embodiment of the invention.
FIG. 5a is a cutout view of a fin mounting bracket according to one embodiment of the invention.

FIGS. 5 and 5a illustrate an alternate embodiment of the device 10 that further includes a fin mounting bracket 50 for allowing each fan assembly 20 to connect directly to the cooling fins of each jug. Accordingly, the fin bracket can include a vertical shaft 51 having an elongated opening 51a, positioned therein and a horizontal shaft 52 having an elongated opening 52a positioned therein. The bracket also includes hardware 53 (such as a nut and bolt, for example) for securing the shafts together. As shown in FIG. 5a, the shafts 51 and 52 can be adjusted vertically and horizontally (see arrow a) to fit the exact location of the engine fins.

The opposite end of the horizontal shaft 52 can split to form a C clamp 52b having a an adjustable bolt 52c for securing directly to the fins 6a1 and 6a2 of the engine. To this end, a horizontal fin can be positioned into the clamp 52b and firmly secured by the adjustment pin 52c, thus ensuring the fan assembly 20 is securely positioned to the engine.

Figure 6:
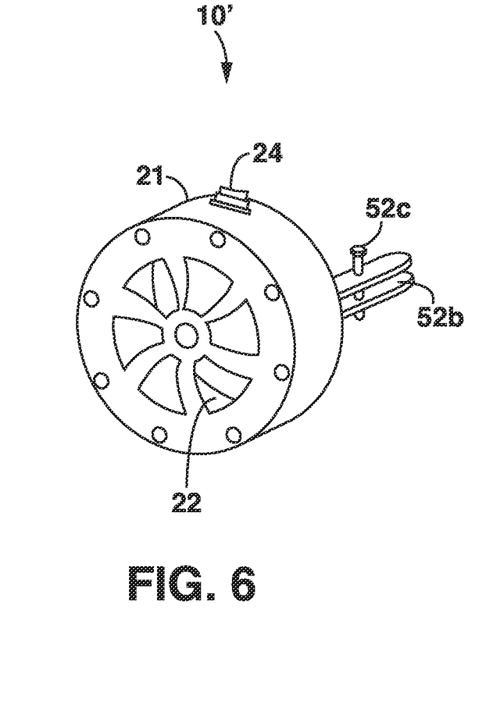
FIG. 6 is a perspective view of the engine cooling device according to an alternate embodiment of the invention.
Figure 6A:
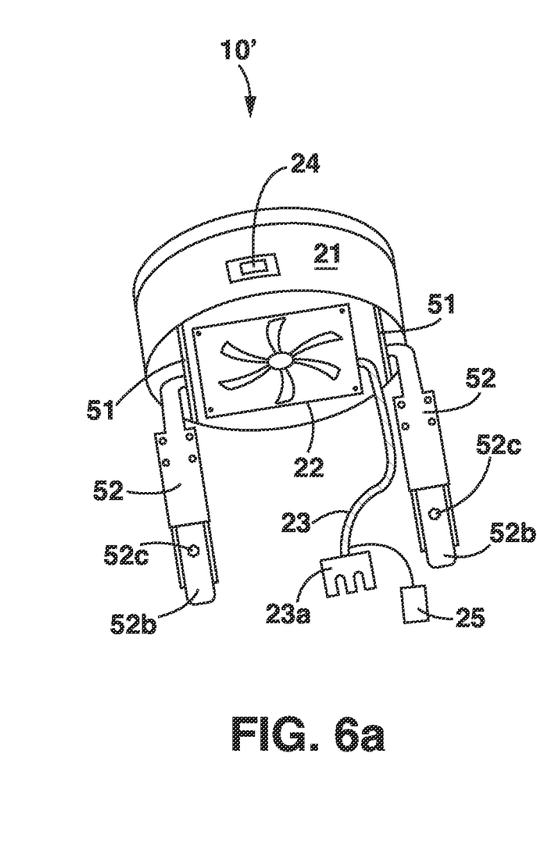
FIG. 6a is another perspective view of the engine cooling device according to an alternate embodiment of the invention.
Figure 7:
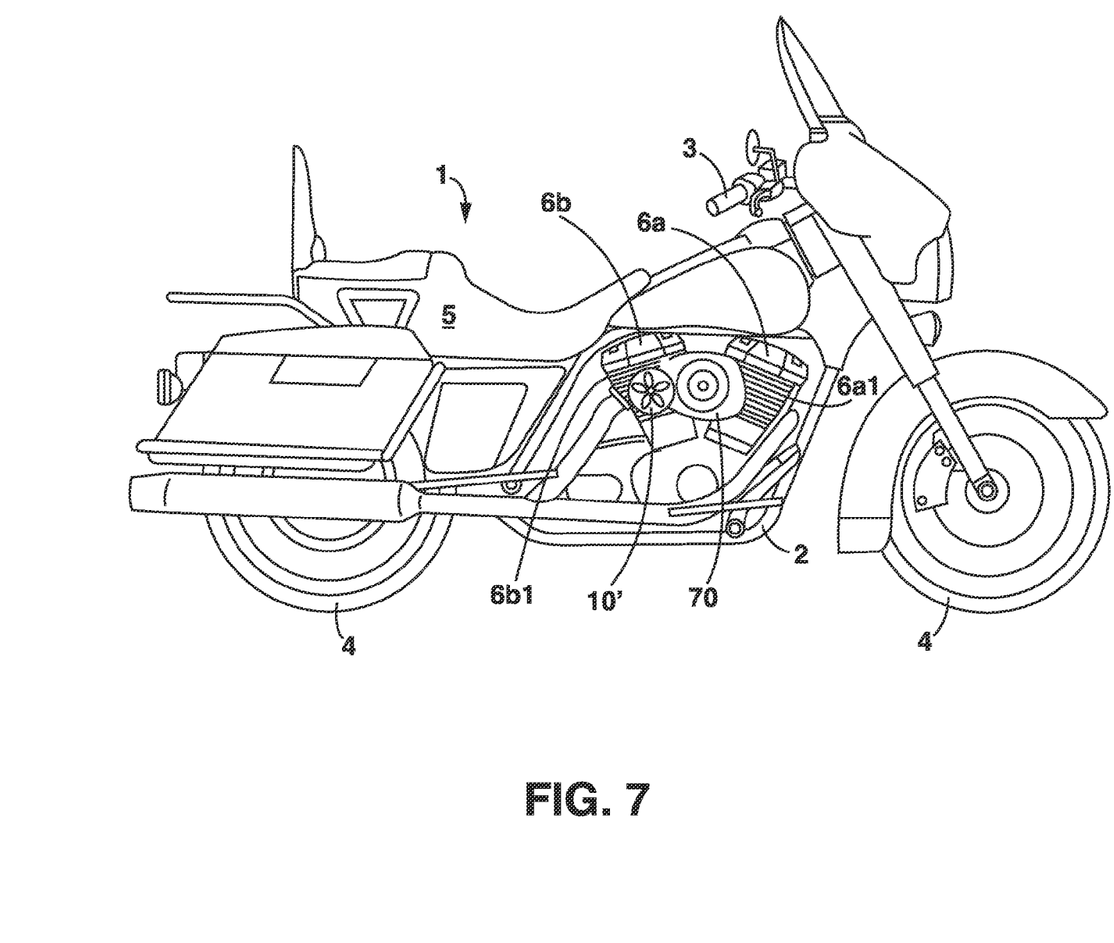
FIG. 7 is a side view of the engine cooling device on a motorcycle according to the alternate embodiment of the invention.

FIGS. 6-7 illustrate an alternate embodiment of the cooling device 10' that includes a single fan assembly 20 and a plurality of fin mounting brackets 50 described above. As shown, by incorporating two or more fin mounting brackets onto a single fan assembly, the device 10' can act to provide fresh air to a single motorcycle fin in the manner described above. Additionally, as shown in FIG. 7, the cooling device 10' can be used in conjunction with the two fan model 10' in order to provide cool air to the right side of the motorcycle engine without interfering with the operation of the air cleaner 70.

As described herein, one or more elements of the engine cooling device 10 and 10' can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the fan housing 21, mounting bracket 11, and/or the fin mounting bracket 50, for example, may be formed together as one continuous element, either through manufacturing processes, such as welding, casting, or molding, or through the use of a singular piece of material milled or machined with the aforementioned components forming identifiable sections thereof.

Figure 8:
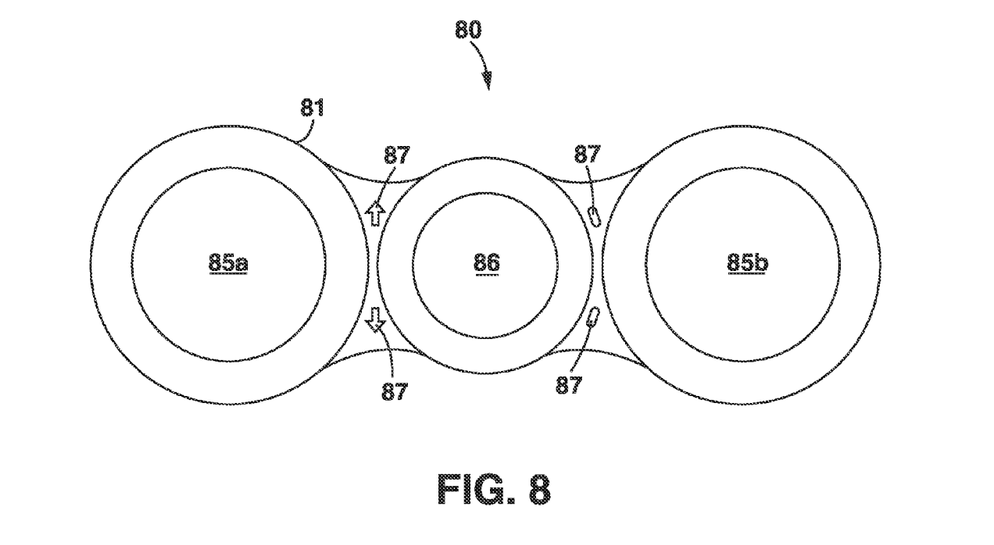
FIG. 8 is a front view of a control device according to one embodiment of the invention.
Figure 9:
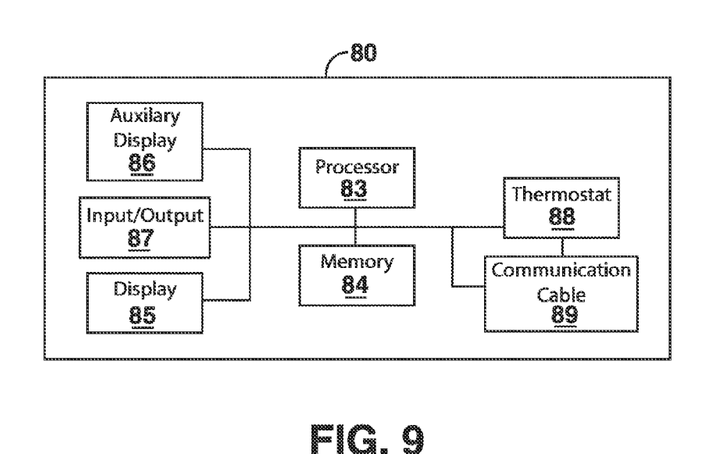
FIG. 9 is a schematic block diagram of a control device according to one embodiment of the invention.
Figure 10:
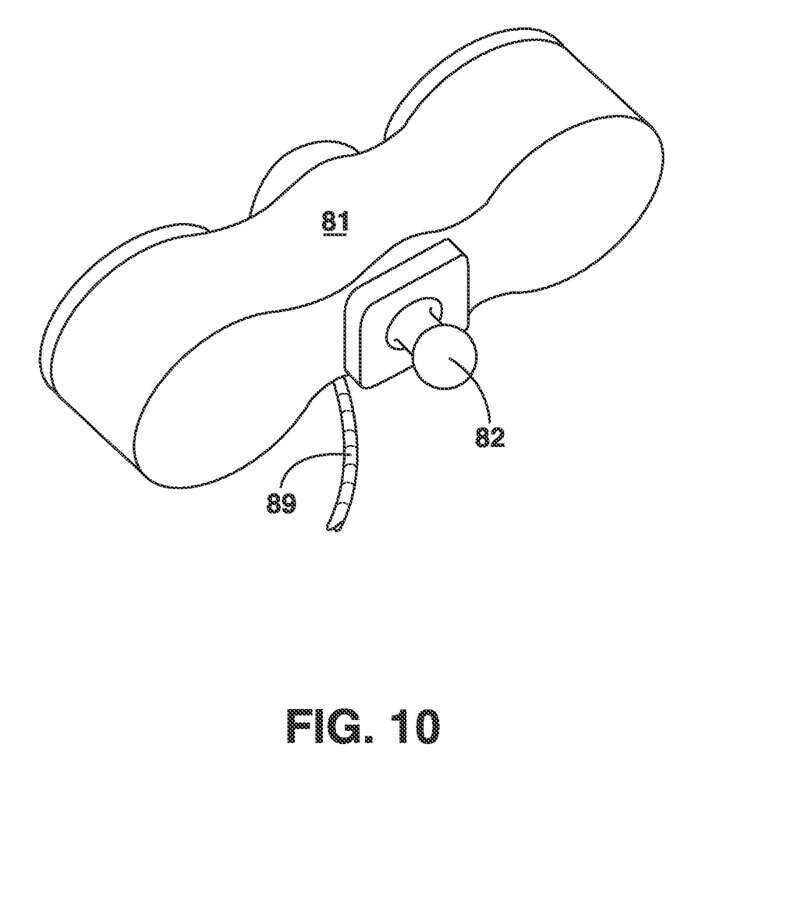
FIG. 10 is a perspective view of a control device according to one embodiment of the invention.

FIGS. 8-10 illustrate one embodiment of a control device 80 for controlling the operation of the engine cooling device 10 and 10' described above. As shown, the controller 80 can include a housing 81 having an attachment clip 82 and a processor 83 that is conventionally connected to an internal memory 84, first and second jug display units 85a and 85b, an auxiliary display unit 86, a plurality of input/output devices 87, a thermostat 88, and a communications cable 89.

The housing 81 can act to securely position each of the elements 82-89 into the base controller 80 in a conventional manner, so as to create a single device for controlling the functionality of the cooling device 10. To this end, the body can be constructed from any number of known materials and methods such as injection molded plastic having a plurality of connectors (not shown) for securely positioning each of the elements 82-89. Of course, other known materials and manufacturing processes are also contemplated.

The attachment clip 82 can act to secure the controller 80 to another device such as a motorcycle handlebar or dashboard in a known manner. As such, one embodiment of the attachment unit can include a conventional faring mount or a ring having a bolt for securing to the handlebars of the motorcycle. Of course, many other known means for securing the unit to a motorcycle can also be utilized.

The processor 83 can act to execute program code stored in the memory 84 in order to allow the device to perform the functionality described herein. Processors are extremely well known in the art, therefore no further description will be provided.

Memory 84 can act to store operating instructions in the form of program code for the processor 11 to execute. Although illustrated in FIG. 6 as a single component, memory 84 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device. Additionally memory 84 can also include one or more cache memories that provide temporary storage of at least some program code in order to reduce the number of times program code must be retrieved from bulk storage device during execution. Each of these devices are well known in the art.

In one embodiment, memory 84 can include program instructions for instructing the processor to activate one or more of the cooling fans 20 upon the occurrence of a specified event such as a report from the thermostat that the engine temperature has reached a predetermined temperature threshold.

The display units 85 and 86 can preferably include an LCD or other similar type of Graphic User Interface (GUI) that is communicatively linked to the processor 83 in order to provide information, such as an individual jug temperature, to a user. Displays and their corresponding elements are extremely well known in the art.

The push buttons 87 can act to accept user inputs and provide instructions to the processor. In one preferred embodiment, each of the buttons can be connected to the processor 83 in order to activate different programmatic functions. Moreover, each button can contain a unique marking for instructing a user as to what function each button performs.

For example, one push button can act to initiate programming for instructing the processor 83 to immediately activate the fan apparatus 20 of a particular jug 6a or 6b, whereas another push button can act to initiate programming for instructing the processor 83 to immediately deactivate the fan apparatus 20 of a particular jug 6a or 6b. Although described above as a push button, one of skill in the art will recognize that any number of different input devices such as conventional switches and toggle levers, for example, can also be utilized.

The thermostat 88 can include any number of conventional sensor devices for communicating with the heat sensors 25 and providing temperature readings to the processor 83.

The communication cable 89 can act to transmit and receive signals between the processor 83 and the cooling device 10 and/or each cooling fan 20 in a conventional manner. To this end, the communications cable can include virtually any type of cable commonly used for this purpose ranging from twisted pair, copper, and fiber optic, for example. Specifically, the communications cable can receive temperature readings for each jug from the thermostat sensor 25 and transmit an on/off signal to one or more of the fan units 20.

Although described above as separate components, it is noted that the communications cable 89 can be the same as, or connected to, the communication cable 23 described above.

A system utilizing the engine cooling device 10 and the control device 80 described above can allow a user to quickly and easily control the temperature of each cylinder of a motorcycle engine.

To this end, the heat sensor(s) 25 can continuously report the temperature of each jug to the display units 85a and 85b. Upon determining that a jug temperature is greater than what is desired, a user can activate the corresponding cooling fan 20 via the appropriately marked input unit 87 or the conventional auxiliary button (if enabled).

Alternatively, the system can act to automatically regulate the temperature of the motorcycle jugs by storing programming instructions in the memory for instructing the processor to automatically activate one or more of the cooling fans when the temperature sensor reports that the actual engine jug temperature, or the oil temperature, has exceeded a predetermined amount.

In one embodiment, the memory 84 can include programming to allow a user to select from a number of predetermined temperatures that have been pre-configured within the memory 84. Alternatively, the memory 84 can include programming to allow a user to input a unique desired temperature for each jug via the push buttons 87.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An engine cooling device for providing fresh air to the cylinder jugs of a v-twin motorcycle having a horn mounting bracket and a protective horn cover, said engine cooling device comprising:
   a first and second fan assembly configured to produce a concentrated flow of air, each of said fan assemblies including a generally circular outer housing configured to protect an electrically powered fan located therein;
   a mounting bracket having a height that is less than a height of the fan assemblies, said mounting bracket including an elongated member having a first end that terminates into a side portion of the first fan assembly, a second end that terminates into a side portion of the second fan assembly, and a middle section that includes a plurality of vertically aligned apertures,
   wherein said apertures are configured to engage and secure the middle section of the mounting bracket to and between each of the motorcycle horn mounting bracket and the protective horn cover, and
   the first and second ends of the mounting bracket are configured to position the fan assemblies adjacent to the motorcycle cylinder jugs; and
   a wiring harness configured to receive power for each of the first and second fan assemblies from an outside device.

2. The engine cooling device of claim 1, wherein the outer housing of each fan assembly includes an on/off switch that is configured to independently operate the fan located within the housing.

3. The engine cooling device of claim 1, wherein the outside device is a motorcycle battery, and the wiring harness further includes a control adapter configured to mate to a conventional motorcycle auxiliary adapter.

4. The engine cooling device of claim 1, further comprising a sensor configured to determine an engine temperature.

5. The engine cooling device of claim 4, wherein said sensor further includes a clip configured to connect to an engine fin.

6. The engine cooling device of claim 4, wherein said sensor includes a means for detecting an oil temperature of the engine.

7. The engine cooling device of claim 1, further comprising one or more adjustable fin clips secured to each of the first and second fan assemblies, each of said fin clips being configured to secure the fan assembly directly to an engine fin.

8. An engine cooling system for providing fresh air to cylinder jugs of a v-twin motorcycle engine, said cooling system comprising:
   a control unit that includes
      a control housing,
      a processor,
      a memory,
      one or more displays configured to announce an engine jug temperature, and
      a communication unit; and
   an engine cooling device that includes
      a first and second fan assembly configured to produce a concentrated flow of air, each of said fan assemblies including a generally circular outer housing configured to protect an electrically powered fan blade located therein,
      a mounting bracket having a height that is less than a height of the fan assemblies, said mounting bracket including an elongated member having a first end that terminates into a side portion of the first fan assembly, a second end that terminates into a side portion of the second fan assembly, and a middle section that includes a plurality of vertically aligned apertures,
      wherein said apertures are configured to engage and secure the middle section of the mounting bracket to and between each of the motorcycle horn mounting bracket and the protective horn cover, and
      the first and second ends of the mounting bracket are configured to position the fan assemblies adjacent to the motorcycle cylinder jugs, and
      a wiring harness configured to relay instructions between the engine cooling device and the communication unit.

9. The engine cooling device of claim 8, wherein the outer housing of each fan assembly includes an on/off switch that is configured to independently operate the fan located within the housing.

10. The engine cooling system of claim 8, wherein the wiring harness further includes an adapter configured to mate to a conventional motorcycle auxiliary adapter.

11. The engine cooling system of claim 8, further comprising:
   a temperature sensor configured to determine an engine temperature and transmit the same to the processor.

12. The engine cooling system of claim 11, wherein said sensor further includes a clip configured to connect to an engine fin.

13. The engine cooling system of claim 11, wherein said sensor includes a means for detecting an oil temperature of the engine.

14. The engine cooling system of claim 8, further comprising one or more adjustable fin clips secured to each of the first and second fan assemblies, each of said fin clips being configured to secure the fan assembly directly to an engine fin.

15. The engine cooling device of claim 1, wherein said mounting bracket is constructed from a single steel member.

16. The engine cooling device of claim 1, wherein the middle section of the mounting bracket includes a generally planar construction, and each of the first and second ends of the mounting bracket extend outward therefrom at an angle of approximately 45 degrees relative to the generally planar middle section.

17. The engine cooling device of claim 1, wherein the middle section of the mounting bracket includes a generally planar construction, and is configured to be interposed between the motorcycle horn bracket and a motorcycle horn.

* * * * *